United States Patent
Solomon

(10) Patent No.: US 12,504,345 B2
(45) Date of Patent: Dec. 23, 2025

(54) SYSTEM AND METHOD FOR DETECTING LEAKS AND LOCATION THEREOF IN PIPES USING MULTI-SPECTRAL CORRELATIONS

(71) Applicant: Aquarius Spectrum Ltd, Netanya (IL)

(72) Inventor: David Solomon, Netanya (IL)

(73) Assignee: AQUARIUS SPECTRUM LTD., Netanya (IL)

( * ) Notice: Subject to any disclaimer, the term of this patent is extended or adjusted under 35 U.S.C. 154(b) by 273 days.

(21) Appl. No.: 18/033,242

(22) PCT Filed: Nov. 4, 2021

(86) PCT No.: PCT/IB2021/060229
§ 371 (c)(1),
(2) Date: Apr. 21, 2023

(87) PCT Pub. No.: WO2022/097066
PCT Pub. Date: May 12, 2022

(65) Prior Publication Data
US 2023/0393017 A1    Dec. 7, 2023

Related U.S. Application Data

(60) Provisional application No. 63/110,066, filed on Nov. 5, 2020.

(51) Int. Cl.
*G01M 3/24*  (2006.01)
*G06F 17/15*  (2006.01)

(52) U.S. Cl.
CPC ........... *G01M 3/243* (2013.01); *G06F 17/153* (2013.01)

(58) Field of Classification Search
CPC ......... G01M 3/00; G01M 3/24; G01M 3/243; G01F 17/00; G01F 17/15; G01F 17/1534
See application file for complete search history.

(56) References Cited

U.S. PATENT DOCUMENTS

| | | | |
|---|---|---|---|
| 5,531,099 A * | 7/1996 | Russo | G01M 3/243 73/592 |
| 6,453,247 B1 * | 9/2002 | Hunaidi | G01M 3/243 702/54 |

(Continued)

FOREIGN PATENT DOCUMENTS

| | | |
|---|---|---|
| CN | 110953485 A | 4/2020 |
| EP | 1 007 931 B1 | 7/2003 |

(Continued)

OTHER PUBLICATIONS

JP-2005265663-A Machine Translation (Year: 2005).*

(Continued)

*Primary Examiner* — Nguyen Q. Ha
(74) *Attorney, Agent, or Firm* — 24IP Law Group USA, PLLC; Timothy R DeWitt

(57) ABSTRACT

A method for detecting leaks in a pipe in a system including a processor and at least one sensor installed on the pipe, may include generating, by the processor, a plurality of signals based on measurements from the at least one sensor. The method may include calculating, by the processor, at least two cross correlations from the plurality of signals. Each cross correlation may correspond to two of the plurality of signals. The method may include calculating, by the processor, a signal to noise ratio (SNR) of each of the at least two cross correlations. The method may include selecting, by the processor, a cross correlation that has a greatest SNR among the at least two cross correlations. The method may include detecting a leak in the pipe based on the selected cross correlation.

23 Claims, 10 Drawing Sheets

(56) References Cited

U.S. PATENT DOCUMENTS

| | | | |
|---|---|---|---|
| 2002/0124633 A1* | 9/2002 | Yang | G01M 3/243 |
| | | | 340/606 |
| 2008/0300803 A1* | 12/2008 | Drake | G01M 3/2815 |
| | | | 702/51 |
| 2012/0096061 A1 | 4/2012 | Hauske | |
| 2019/0128766 A1 | 5/2019 | Burtea et al. | |
| 2019/0368964 A1* | 12/2019 | Inoue | G01M 3/243 |
| 2020/0124494 A1 | 4/2020 | Solomon et al. | |
| 2023/0265976 A1* | 8/2023 | Abidova | G01M 3/243 |
| | | | 73/40.5 A |

FOREIGN PATENT DOCUMENTS

| | | | | |
|---|---|---|---|---|
| GB | 2421311 A | * | 6/2006 | G01M 3/243 |
| JP | 2005265663 A | * | 9/2005 | G01M 3/24 |
| WO | 2020/079650 A1 | | 4/2020 | |

OTHER PUBLICATIONS

Jiang et al. "Extracting reflection with wavelet transform in vibroseis signal processing" pp. 10,28 236-242. Journal of Geophysics and Engineering. Online. Jul. 14, 2006; [retrieved Mar. 4, 2022).

* cited by examiner

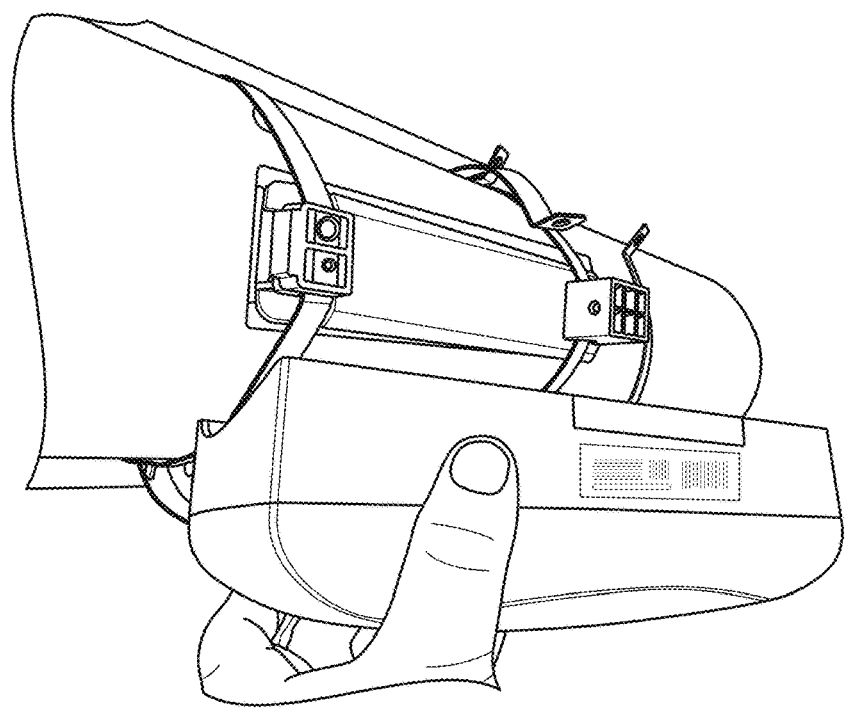
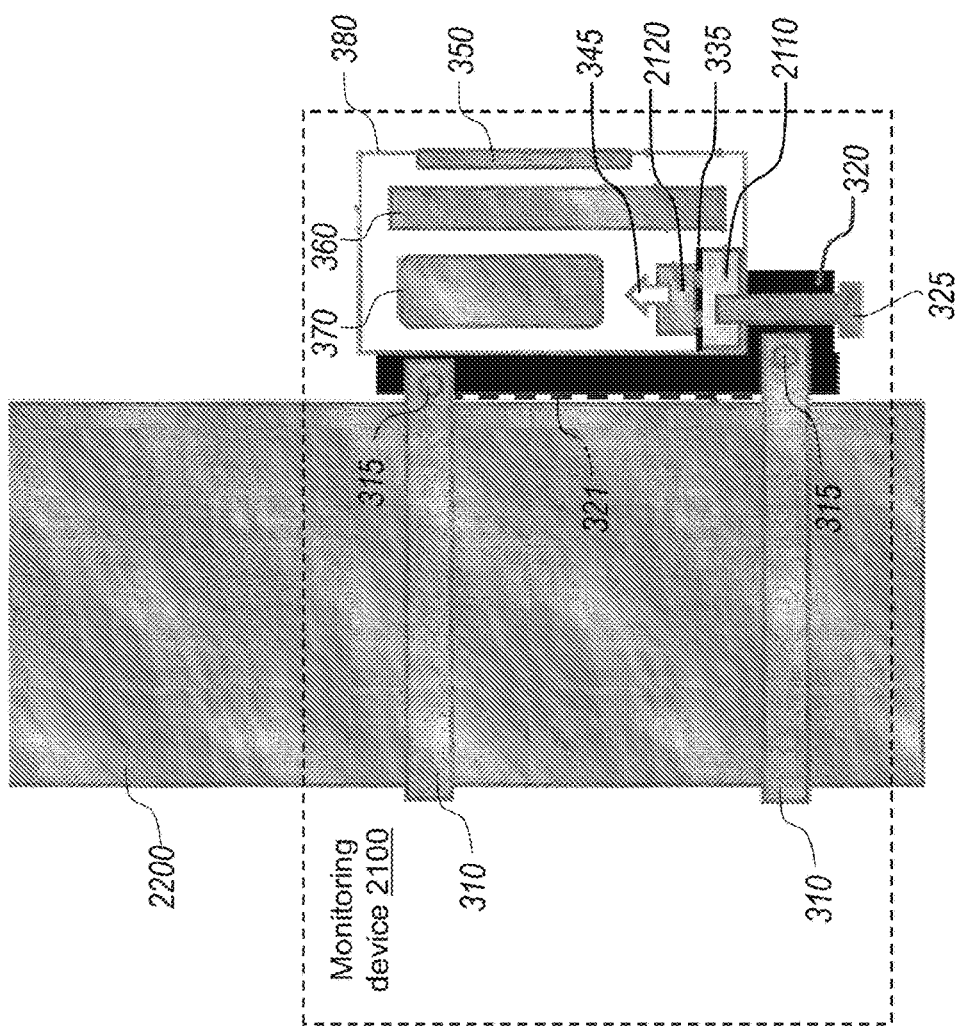
FIG. 3A
FIG. 3B

SYSTEM AND METHOD FOR DETECTING LEAKS AND LOCATION THEREOF IN PIPES USING MULTI-SPECTRAL CORRELATIONS

CROSS-REFERENCE TO RELATED APPLICATION

This application claims the benefit of and priority to U.S. Provisional Patent Application No. 63/110,066, filed Nov. 5, 2020, the entire disclosure of which is incorporated herein by reference.

TECHNICAL FIELD

The present embodiments relate generally to system and method for detecting leaks in a pipe, and more particularly to system and method for detecting leaks in a pipe based on a cross correlation of signals.

BACKGROUND

Leak detection in pipes can be performed by performing spectral analysis based on cross correlation of acoustic signals.

Cross correlation is a pattern matching algorithm that find similarity in two signals with a time shift. For example, if x[n] and y[n] are two discrete-time signals, then the correlation $r_{xy}[l]$ of x[n] with respect to y[n] is given as:

$$r_{xy}[l] = \sum_{m=-\infty}^{\infty} x[m]y[m-l] \quad \text{(Equation 1)}$$

where l is a (time) lag, indicating a time-shift.

In frequency domain, a cross spectrum corresponding to a cross-correlation can be represented as:

$$R_{xy}(f) = X(f)^* X(f)' \quad \text{(Equation 2)}$$

where X(f) is Fourier transform of x[m], X(f)' is a conjugate of Fourier transform X(f).

$$r_{xy}[l] = F^{-1}(R_{xy}(f)), \quad \text{(Equation 3)}$$

where $F^{-1}$ denotes an inverse Fourier transform.

Improvements in leak detection based on correlation and spectral analysis still remain desired.

SUMMARY OF THE INVENTION

The present embodiments relate to systems and methods for detecting leaks in a pipe based on a cross correlation of signals with a maximum signal to noise ratio (SNR).

According to certain aspects, embodiments provide a method for detecting leaks in a pipe in a system including a processor and at least one sensor installed on the pipe, may include generating, by the processor, a plurality of signals based on measurements from the at least one sensor. The method may include calculating, by the processor, at least two cross correlations from the plurality of signals. Each cross correlation may correspond to two of the plurality of signals. The method may include calculating, by the processor, a signal to noise ratio (SNR) of each of the at least two cross correlations. The method may include selecting, by the processor, a cross correlation that has a greatest SNR among the at least two cross correlations. The method may include detecting a leak in the pipe based on the selected cross correlation.

According to other aspects, embodiments provide a system for detecting leaks in a pipe, may include at least one sensor installed on the pipe, and a processor. The processor may be configured to generate a plurality of signals based on measurements from the at least one sensor. The processor may be configured to calculate at least two cross correlations from the plurality of signals, each cross correlation corresponding to two of the plurality of signals. The processor may be configured to calculate a signal to noise ratio (SNR) of each of the at least two cross correlations. The processor may be configured to select a cross correlation that has a greatest SNR among the at least two cross correlations. The processor may be configured to detect a leak in the pipe based on the selected cross correlation.

According to further aspects, embodiments provide a device for monitoring operations of a pipe connected to an outlet pipe that has a valve from which fluid can be tapped, may include a first support, a sensor, and a second support. The first support may have a first surface coupled to the outlet pipe. The sensor may be configured to measure vibration on the outlet pipe. The second support may have a second surface coupled to the sensor. The second surface may be perpendicular to an axial direction of the outlet pipe such that the sensor measures vibration in the axial direction of the outlet pipe.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 3A is a block diagram illustrating an example monitoring device according to some embodiments, and FIG. 3B illustrating another example monitoring device according to some embodiments;

DETAILED DESCRIPTION

Figure 1:
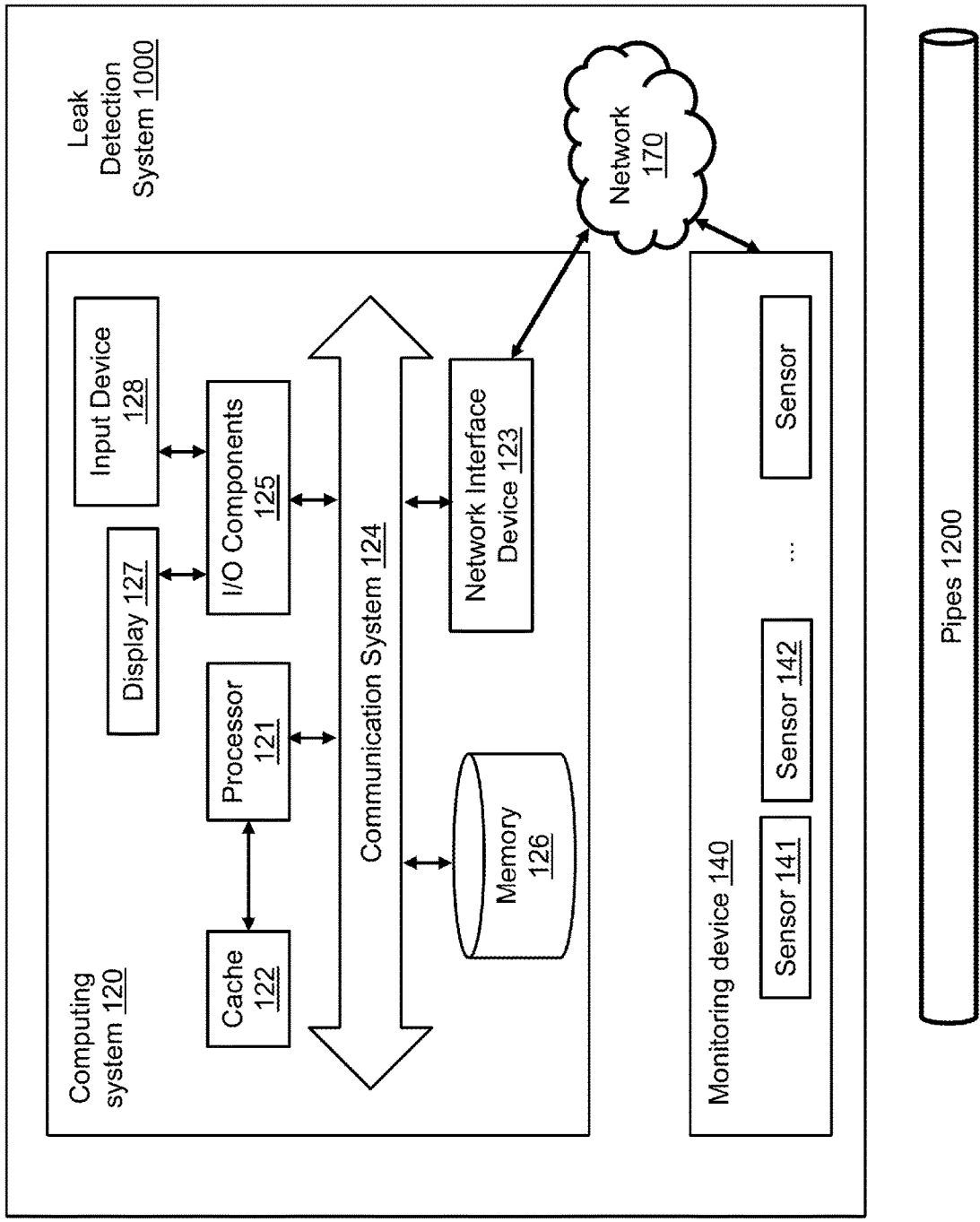
FIG. 1 is a block diagram illustrating an example leak detection system according to some embodiments.

According to certain aspects, embodiments in the present disclosure relate to techniques for detecting leaks in a pipe based on a cross correlation of signals with a maximum signal to noise ratio (SNR) and/or monitoring operations of a pipe using a sensor.

Leak detection by a sensor (e.g., acoustic sensor) may be performed by measurement on a pipe over a large pipe length of 200-600 meters, while the pipe can be branched and have varying diameters and materials. Based on such measurements on the pipe, leak detection can be performed by performing spectral analysis based on cross correlation of acoustic signals.

One problem of the leak detection by cross correlation is that a cross correlation may have a very low signal to noise ratio (SNR), due to the following factors:
1. Attenuation of the leak vibrations that are picked by sensors—the attenuation is frequency dependent as pipes support modes propagation that is frequency dependent. In case of a pipeline with section of different diameters, the diffraction phenomena can cause a complex frequency dependent attenuation, in addition modes propagation;
2. Liquid flow noise that is not located at one specific place but rather distributed over the whole pipe and reaches each sensor; and
3. External noise that does not come from the pipe (e.g., noise coming from traffic, etc.).

All these factors may create a frequency dependent SNR, which indicates that at certain frequencies the leak noise is more vivid than in another frequencies.

In some embodiments, a coherence function may be used to optimize a filter of the signal by tuning the filter at maximum of the coherence function. For example, a coherence function $C_{xy}$ between two signals x, y at a frequency $\omega$ is given as:

$$C_{xy}(\omega) \triangleq \frac{|R_{xy}(\omega)|^2}{R_x(\omega)R_y(\omega)}.$$ (Equation 4)

However, an experiment shows that in a low SNR, such coherence function cannot detect optimal frequencies in which the correlation is optimal.

To solve this problem, according to certain aspects, embodiments in the present disclosure relate to techniques for detecting leaks in a pipe based on a cross correlation of signals with a maximum signal to noise ratio (SNR).

In some embodiments, the leak detection by cross correlation algorithm can be improved by finding an optimal filter or optimal frequency ranges that will improve the SNR of the cross correlation. In some embodiments, a set of filters that perform frequency filtering of acoustic signals can be defined.

In some embodiments, signals can be filtered based on such optimal filter or a plurality of optimal frequency ranges, and multiple cross correlations can be calculated from the filtered signals.

In some embodiments, the SNR of each of multiple cross correlations can be calculated. In some embodiments, among multiple cross correlations, a cross correlation with a maximum SNR can be selected.

In some embodiments, location and intensity of a leak can be calculated based on the selected cross correlation with a maximum SNR. In some embodiments, a location of the leak relative to sensors can be calculated based on a maximum lag of cross correlation. In some embodiments, intensity of the leak can be calculated based on acoustic power that is calculated by acoustic sensors.

According to certain aspects, embodiments provide a method for detecting leaks in a pipe in a system including a processor and at least one sensor installed on the pipe, may include generating, by the processor, a plurality of signals based on measurements from the at least one sensor. The method may include calculating, by the processor, a plurality of cross correlations from the plurality of signals. Each cross correlation may correspond to two of the plurality of signals. The method may include calculating, by the processor, a signal to noise ratio (SNR) of each of the plurality of cross correlations. The method may include selecting, by the processor, a cross correlation that has a greatest SNR among the plurality of cross correlations. The method may include detecting a leak in the pipe based on the selected cross correlation.

According to other aspects, embodiments provide a system for detecting leaks in a pipe, may include at least one sensor installed on the pipe, and a processor. The processor may be configured to generate a plurality of signals based on measurements from the at least one sensor. The processor may be configured to calculate a plurality of cross correlations from the plurality of signals, each cross correlation corresponding to two of the plurality of signals. The processor may be configured to calculate a signal to noise ratio (SNR) of each of the plurality of cross correlations. The processor may be configured to select a cross correlation that has a greatest SNR among the plurality of cross correlations. The processor may be configured to detect a leak in the pipe based on the selected cross correlation.

Another problem of leak detection relates to a device for monitoring operations of a pipe. Acoustic leak detection can be performed by collecting or measuring vibrations that are originating from a leak and propagate over a pipe network. Vibration from the leak can be measured by a sensor (e.g., an acoustic sensor, an accelerometer or a water meter). One way to install a sensor is to place the sensor on a hydrant (e.g., a fire hydrant). This installation on a hydrant has advantages as it is accessible and easy to maintain. However, because the sensor is not installed on a main pipe, this installation on a hydrant may provide less sensitive measurements that that on a main pipe. The installation and coupling of a sensor to a hydrant is challenging as it is important to get good coupling to the pipe and have a simple installation method.

To solve this problem, according to certain aspects, embodiments in the present disclosure relate to techniques for monitoring operations of a pipe connected to an outlet pipe (e.g., hydrant or fire hydrant) with a device that is coupled or attached to the outlet device and has a support coupled to a sensor (e.g., an acoustic sensor, an accelerometer or a water meter) such that the sensor measures vibration in an axial direction of the outlet pipe. It has been found that vibrations along an axial direction of the hydrant body is more significant for leak detection than vibrations along a radial direction of the hydrant body. It has also been found that environmental noise is more effecting the radial vibrations, while main pipe vibrations create more axial vibrations.

In some embodiments, a device for monitoring operations of a pipe connected to an outlet pipe may include a first support coupled to the outlet pipe and a second support coupled to a sensor for axial direction measurement on the outlet pipe.

According to further aspects, embodiments provide a device for monitoring operations of a pipe connected to an outlet pipe that has a valve from which fluid can be tapped, may include a first support, a sensor, and a second support. The first support may have a first surface coupled to the outlet pipe. The sensor may be configured to measure vibration on the outlet pipe. The second support may have a second surface coupled to the sensor. The second surface may be perpendicular to an axial direction of the outlet pipe such that the sensor measures vibration in the axial direction of the outlet pipe.

Embodiments in the present disclosure have at least the following advantages and benefits.

First, embodiments in the present disclosure can provide useful techniques for obtaining a correlation with an optimal or maximal signal to noise ratio (SNR) using multi-spectral correlations. With these techniques, it is possible to avoid correlations with a low SNR that may occur due to attenuation of leak, liquid flow noise distributed over the whole pipe, and/or external noise that does not come from the pipe.

Second, embodiments in the present disclosure can provide useful techniques for finding an optimal filter or optimal frequency ranges that can improve SNR of cross correlations. With these techniques, it is possible to detect leaks that cannot be detected with cross correlation using non-optimal filtering.

Third, embodiments in the present disclosure can provide useful techniques for measuring acoustic vibrations in an axial direction of a hydrant. With these techniques, it is possible to measure vibrations that are more significant for leak detection and to avoid measuring environmental noise.

FIG. 1 is a block diagram illustrating an example leak detection system according to some embodiments.

In some embodiments, a leak detection system 1000 may include a computing system 120 and a monitoring device 140 for monitoring an operation of pipes 1200. The monitoring device 140 may include a plurality of sensors including sensors 141 and 142. In some embodiments, each of the sensors may be one of an acoustic sensor, an accelerometer, a water meter, or a pressure sensor. The monitoring device 140 may include a network interface device (not shown) with which measurements data from at least one of the sensors can be transmitted to/from the computing system 120.

Referring to FIG. 1, the illustrated example computing system 120 includes one or more processors 121 in communication, via a communication system 124 (e.g., bus), with memory 126, at least one network interface device 123 with network interface port for connection to a network 170 (e.g., a Local Area Network ("LAN"), a wide area network ("WAN"), a wireless network, and/or the Internet, among others), and other components, e.g., input/output ("I/O") components 125. Generally, the processor(s) 121 will execute instructions (or computer programs) received from memory. The processor(s) 121 illustrated incorporate, or are directly connected to, cache memory 122. In some instances, instructions are read from memory 126 into cache memory 122 and executed by the processor(s) 121 from cache memory 122.

In more detail, the processor(s) 121 may be any logic circuitry that processes instructions, e.g., instructions fetched from the memory 126 or cache 122. In many implementations, the processor(s) 121 are microprocessor units or special purpose processors. The computing device 120 may be based on any processor, or set of processors, capable of operating as described herein. The processor(s) 121 may be single core or multi-core processor(s). The processor(s) 121 may be multiple distinct processors.

The memory 126 may be any device suitable for storing computer readable data. The memory 126 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 120 may have any number of memory devices 126.

The cache memory 122 is generally a form of computer memory placed in close proximity to the processor(s) 121 for fast read times. In some implementations, the cache memory 122 is part of, or on the same chip as, the processor(s) 121. In some implementations, there are multiple levels of cache 122, e.g., L2 and L3 cache layers.

The network interface device 123 manages data exchanges via the network interface (sometimes referred to as network interface ports). The network interface device 123 handles the physical and data link layers of the OSI model for network communication. In some implementations, some of the network interface controller's tasks are handled by one or more of the processor(s) 121. In some implementations, the network interface controller 123 is part of a processor 121. In some implementations, a computing system 120 has multiple network interfaces controlled by a single device 123. In some implementations, a computing system 120 has multiple network interface controllers 123. In some implementations, each network interface is a connection point for a physical network link (e.g., a cat-5 Ethernet link). In some implementations, the network interface controller 123 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 123 implements one or more network protocols such as Ethernet. Generally, a computing device 120 exchanges data with other computing devices via physical or wireless links through a network interface. The network interface may link directly to another device or to another device via an intermediary device, e.g., a network device such as a hub, a bridge, a switch, or a router, connecting the computing system 120 to a data network such as the Internet.

The computing system 120 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 120 may include an interface (e.g., a universal serial bus (USB) interface) for connecting input devices, output devices, or additional memory devices (e.g., portable flash drive or external media drive). In some implementations, a computing device 120 includes an additional device such as a co-processor, e.g., a math co-processor can assist the processor 121 with high precision or complex calculations.

The components 125 may be configured to connect with external media, a display 127, an input device 128 or any other components in the computing system 3000, or combinations thereof. The display 127 may be a liquid crystal display (LCD), an organic light emitting diode (OLED), a flat panel display, a solid state display, a cathode ray tube (CRT), a projector, a printer or other now known or later developed display device for outputting determined information. The display 127 may act as an interface for the user to see the functioning of the processor(s) 121, or specifically as an interface with the software stored in the memory 126.

The input device 128 may be configured to allow a user to interact with any of the components of the computing system 120. The input device 128 may be a plurality pad, a keyboard, a cursor control device, such as a mouse, or a joystick. Also, the input device 128 may be a remote control, touchscreen display (which may be a combination of the display 127 and the input device 128), or any other device operative to interact with the computing system 120, such as any device operative to act as an interface between a user and the computing system 120.

Figure 2:
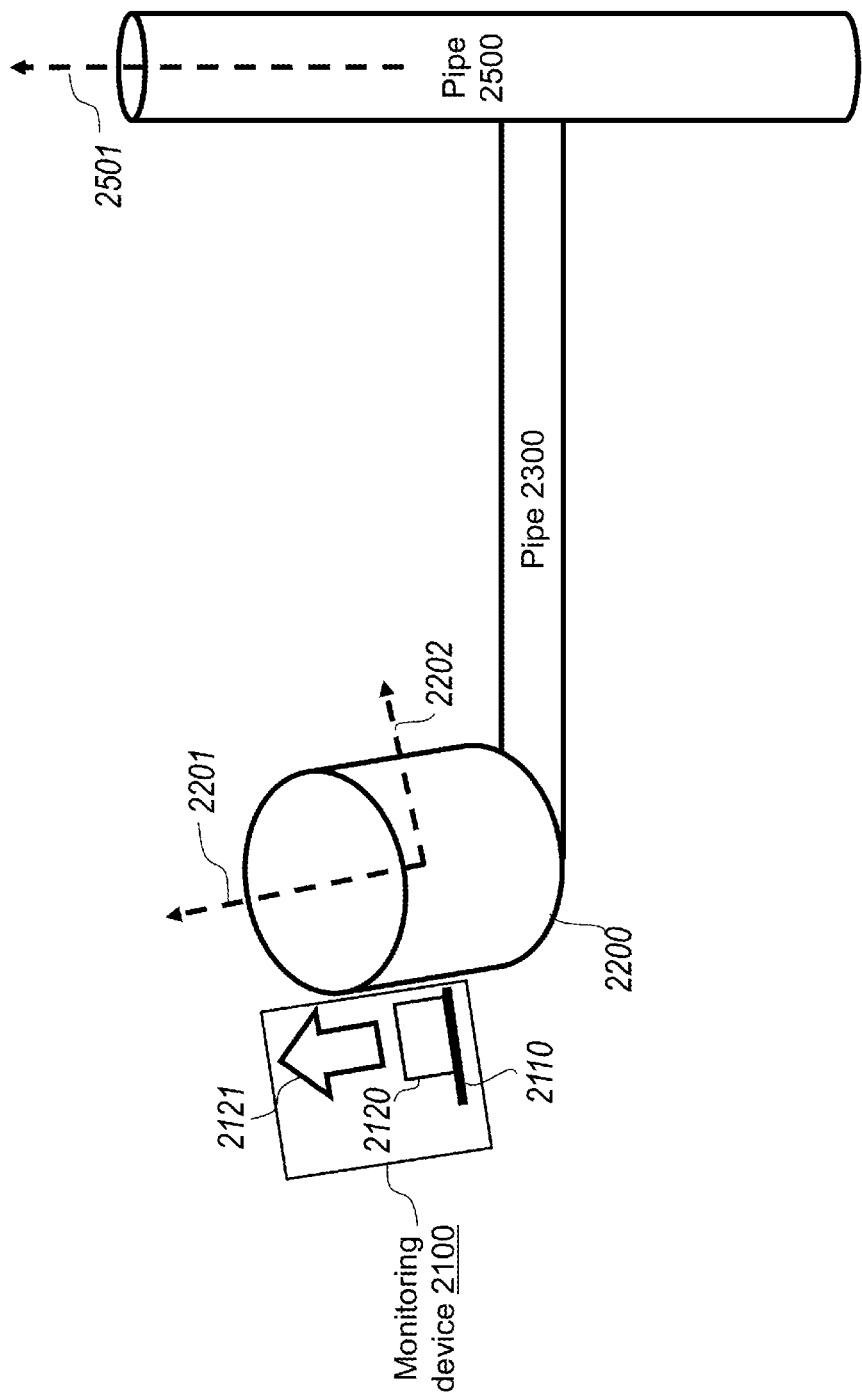
FIG. 2 illustrates detection of leaks in a pipe using a monitoring device according to some embodiments.

FIG. 2 illustrates detection of leaks in a pipe using a monitoring device according to some embodiments. In some embodiments, the monitoring device 140 (see FIG. 1) may have configuration of a monitoring device 2100 as shown in FIG. 2 and FIG. 3A.

Referring to FIG. 2, the monitoring device 2100 may be attached or coupled to an outlet pipe 2200 which is connected to a pipe 2500 (e.g., a main pipe) via a pipe 2300 (e.g., a branch pipe branched from the main pipe). In some embodiments, the outlet pipe 2200 may be one of a hydrant or a fire hydrant that has a valve from which fluid can be tapped. In some embodiments, the outlet pipe 2200 may have a cylindrical shape that has an axial direction 2201 and a radial direction 2202.

In some embodiments, the monitoring device 2100 may have one or more sensors including a sensor 2120. In some embodiments, the sensor 2120 may be one of an acoustic sensor, an accelerometer, a water meter, or a pressure sensor. The monitoring device 2100 may include a support 2110 coupled to the sensor 2120 such that the sensor is installed in a position to measure vibration in a direction 2121 which is the same as, or substantially parallel with, the axial direction 2201 of the outlet pipe 2200. In some embodiments, the support 2110 may have locking means (not shown) to hold the sensor, including fasteners (e.g., bolts), clips, welds, adhesives, and/or other locks to hold the components of the sensor.

FIG. 3A is a block diagram illustrating an example monitoring device according to some embodiments.

In some embodiments, the monitoring device 2100 may have the sensor 2120 (e.g., an accelerometer or an acoustic sensor) attached to the outlet pipe 2200 via one or more bands 310 that strap the sensor to the outlet pipe 2120 (e.g., a hydrant). In some embodiments, the monitoring device 2100 may have a support 320 that has a coupling surface 321 to the outlet pipe 2200. In some embodiments, the coupling surface 321 can be smooth or rugged to create good acoustic coupling to the outlet pipe of various diameters. In some embodiments, the monitoring device 2100 may have the support 2100 that has a coupling surface 335 to the sensor 2120. In some embodiments, the bands 310 may be tightened around the outlet pipe by bolts or other fastening means that can tighten the bands and fasten the monitoring device to the outlet pipe. For example, the bands 310 can be fixed or coupled to the support 320 via fasteners 315 (e.g., bolts).

In some embodiments, the monitoring device 2100 may have a case or enclosure 380 to enclose at least one of one or more antennas 350, a printed circuit board (PCB) 360, at least one battery 370, or the sensor 2120. In some embodiments, the coupling surface 321 to the outlet pipe 2200 may be external to the case 380 while the coupling surface 335 to the sensor 2120 is internal inside the case 380. In some embodiments, the case 380 may include several separate parts.

In some embodiments, the sensor 2120 (e.g., an accelerometer) may be coupled to the coupling surface 335 via locking means (e.g., fasteners (e.g., bolts), clips, welds, adhesives, etc.) so as to provide a good acoustic coupling such that acoustic vibration transmission coefficient (e.g., function amplitude) from the body of the outlet pipe to the coupling surface 335 via the coupling surface 321 is above 80% for frequencies 1 Hz to 2 khz, and/or resonance Q (or Q factor) is below 10. In some embodiments, the support 2100 can support connection of the sensor 2120 such that the sensor 2120 can measure vibrations along an axial direction of the outlet pipe 2200 (e.g., a direction 345 in FIG. 3A or the direction 2121 in FIG. 2). In some embodiments, the support 2100 and the support 320 may be one piece. In some embodiments, the support 2100 and the support 320 may be separate pieces coupled with fastening means 325 between them (e.g., fasteners (e.g., bolts), clips, welds, adhesives, etc.).

FIG. 3B illustrating another example monitoring device according to some embodiments. In some embodiments, locking means or fastening means may be concealed via a case or enclosure. In some embodiments, the locking means or fastening means may be accessed only before the enclosure assembly that will be concealed when the case or enclosure is fastened by the fastening means 325 (see FIGS. 3A and 3B). For example, the fastening means 315 (see FIG. 3A) may be concealed after fastening to a hydrant (see FIG. 3B).

In some embodiments, a device (e.g., the monitoring device 2100 in FIG. 2) for monitoring operations of a pipe (e.g., the pipe 2500 in FIG. 2) connected to an outlet pipe (e.g., the outlet pipe 2200 in FIGS. 2-3) that has a valve from which fluid can be tapped, may include a first support (e.g., the support 320 in FIG. 3), a sensor (e.g., the sensor 2120 in FIGS. 2-3), and a second support (e.g., the support 2100 in FIGS. 2-3). The first support may have a first surface (e.g., the coupling surface 321 in FIG. 3) coupled to the outlet pipe. The sensor may be configured to measure vibration on the outlet pipe. The second support may have a second surface (e.g., the coupling surface 335 in FIG. 3) coupled to the sensor. The second surface may be perpendicular to an axial direction of the outlet pipe (e.g., the direction 2201, 2121, or 345 in FIGS. 2-3) such that the sensor measures vibration in the axial direction of the outlet pipe.

In some embodiments, the outlet pipe may be a hydrant connected to the pipe (e.g., the pipe 2500 in FIG. 2). The sensor may include at least one of an accelerometer or an acoustic sensor.

In some embodiments, the outlet pipe may be connected to a branch pipe (e.g., the pipe 2300 in FIG. 2) branched from the pipe.

In some embodiments, the device may further include a printed circuit board (PCB) (e.g., the PCB 360 in FIG. 3), at least one antenna (e.g., the antenna 350 in FIG. 3), at least one battery (e.g., the battery 370 in FIG. 3), and a case (e.g., the case 380 in FIG. 3) configured to enclose the sensor, the PCB, the at least one antenna, and the at least one battery.

In some embodiments, the device may further include at least one band (e.g., the bands 310 in FIG. 3) attached to the first support. The at least one band may be configured to bind the outlet pipe such that the first surface (e.g., the coupling surface 321 in FIG. 3) is coupled to an outer surface of the outlet pipe. The first surface may be rugged.

In some embodiments, the sensor may be coupled to the second surface via a fastener such that vibration transmission coefficient is greater than 80% for frequencies 1 Hz to 2 kHz and Q factor is smaller than 10.

Figure 4:
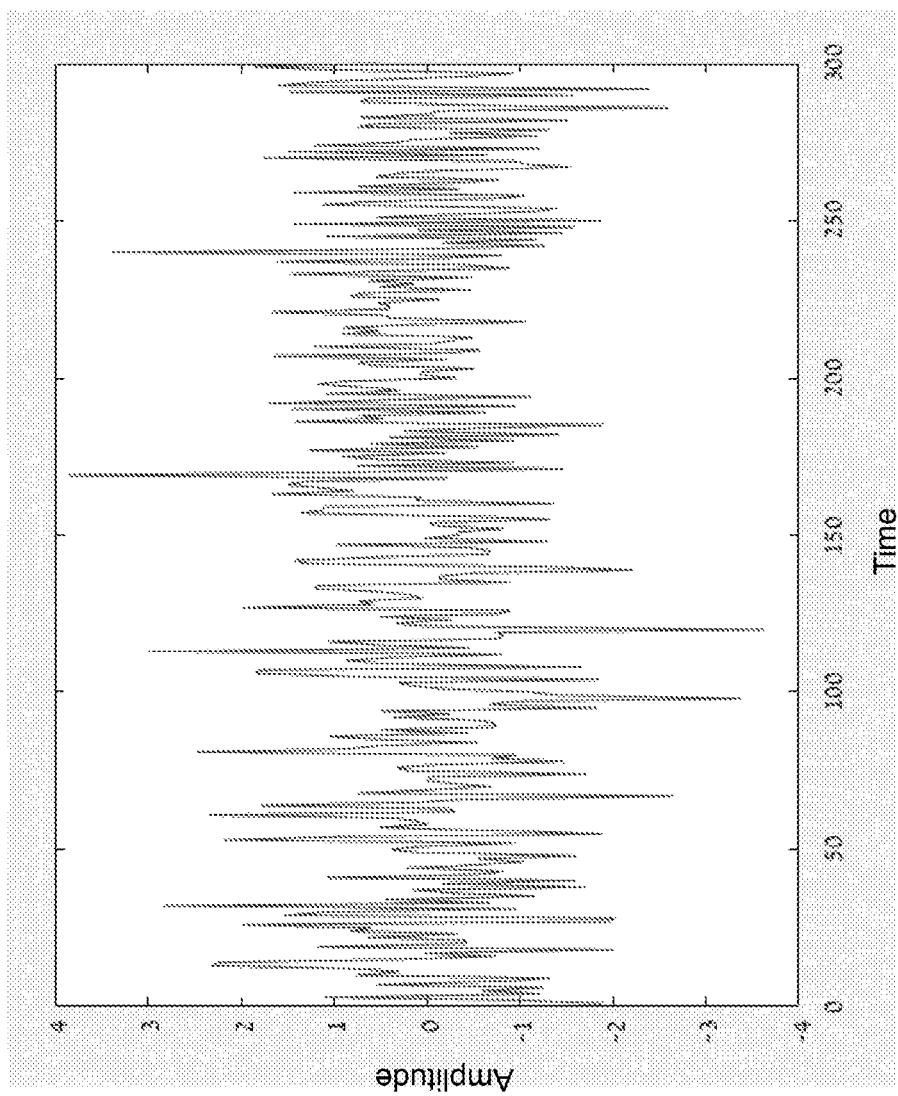
FIG. 4 is a diagram illustrating example raw signals according to some embodiments.

FIG. 4 is a diagram illustrating example raw signals according to some embodiments.

In some embodiments, at least one sensor (e.g., sensor 141 or 142 in FIG. 1) of a pipe monitoring device (e.g., the monitoring device 140 in FIG. 1) may be an acoustic sensor configured to collect or measure raw acoustic signals (see FIG. 4) from a pipe (e.g., pipes 1200 in FIG. 1).

Figure 5:
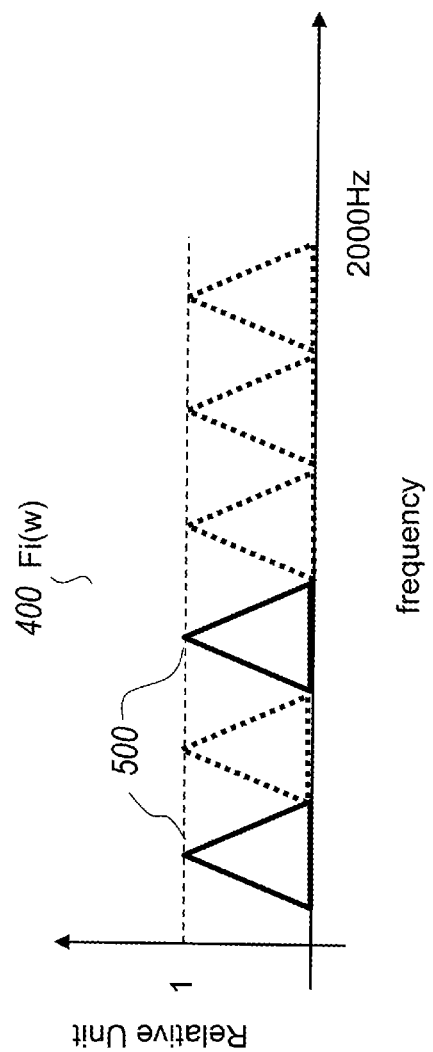
FIG. 5 is a diagram illustrating an example frequency filter according to some embodiments.

FIG. 5 is a diagram illustrating an example frequency filter according to some embodiments.

In some embodiments, a set of filters can be defined to perform frequency filtering of raw acoustic signals (see FIG. 4). In some embodiments, the frequency filtering may be performed by applying a mathematical transformation (e.g., $F_i(\omega)$ in frequency ($\omega$) domain or a convolution kernel $h_i(t)$ in time domain) to each of raw acoustic signals. Referring to FIG. 5, in some embodiments, filters 400 (e.g., $i^{th}$ filter) can be defined as $F_i(\omega)$ in frequency ($\omega$) domain. Alternatively, in some embodiments, the filters (e.g., $i^{th}$ filter) can be defined in time domain as a convolution kernel $h_i(t)$. In some embodiments, the filters can be defined over a range of sensor frequency response. For example, the range of sensor frequency response is typically 20-2000 Hz (see FIG. 5). In some embodiments, the filters $F_i(\omega)$ can be defined as an assembly of rectangular or triangular different frequencies over frequency ranges. For example, as shown in FIG. 5, solid line indicates a filter 500 in 2 frequency ranges. In some embodiments, the filters $F_i(\omega)$ can be defined as fractal division of frequency ranges.

In some embodiments, a computing system (e.g., the computing system 120 in FIG. 1) may receive raw acoustic signals relating to a pipe (e.g., the pipes 1200 in FIG. 1) from a monitoring device (e.g., the monitoring device 140). In some embodiments, the computing system may perform frequency filtering on raw acoustic signals received from the monitoring device. For example, the computing system 120 may apply the $i^{th}$ filter $F_i(\omega)$ to raw acoustic signals $S_1$ and $S_2$ to obtain filtered signals $S_{1i}$ and $S_{2i}$. In some embodiments, the filter may include one central frequency, while performance may be improved by optimizing the width of filter "Fw" and including several ranges with frequencies F1 and F2. The optimization of the filter in terms of F1, F2 and Fw is important for improving the correlation results. In some embodiments, the filter may include a central frequency and a width Fw. The frequency range of the sensor response may include a first frequency range F1 and a second frequency range F2. The filter may be optimized by adjusting the filter in terms of the width Fw and the ranges F1 and F2 to improve a result of calculating the cross correlations.

An alternative approach for filtering is using continuous wavelet transform, while choosing the optimal wavelet to provide an optimal correlation. In some embodiments, the wavelet transform C is defined by wavelet $\Psi$ (Phi) with scaling parameter a and a transactional value b, the optimization includes finding most suitable Phi and "a", as follows:

$$C(a, b; f(t), \Psi(t)) = \int_{-\infty}^{\infty} f(t) \frac{1}{\sqrt{a}} \Psi^*\left(\frac{t-b}{a}\right) dt \quad \text{(Equation 16)}$$

In some embodiments, a wavelet $\Psi$ and a scaling parameter a may be found such that the wavelet $\Psi$ and the scaling parameter a can optimize a result of calculating the at least two cross correlations.

Figure 6:
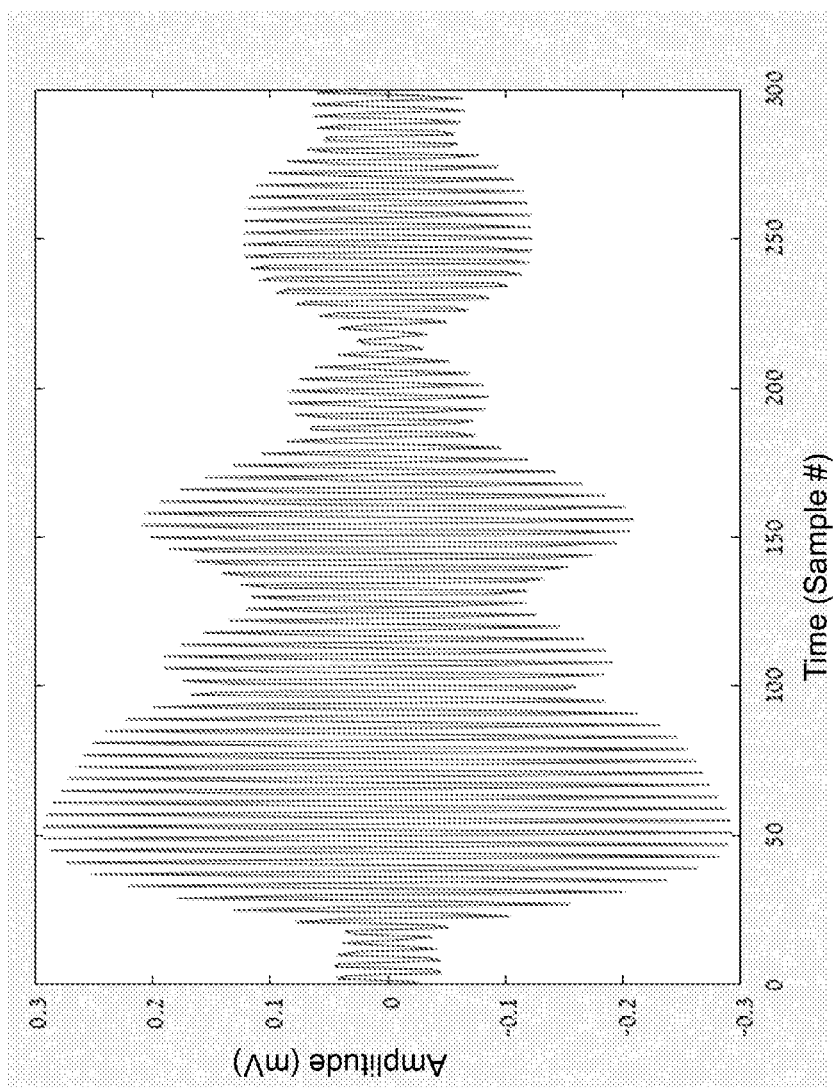
FIG. 6 is a diagram illustrating example filtered signals according to some embodiments.

FIG. 6 is a diagram illustrating examplary filtered signals according to some embodiments.

In some embodiments, the computing system may perform cross correlation on filtered signals (see FIG. 6) filtered by a frequency filter (e.g., $F_i(\omega)$). In some embodiments, $i^{th}$ cross correlation $R_i(\omega)$ and $R_i(l)$ of filtered signals (e.g., $S_{1i}$ and $S_{2i}$) can be defined in frequency domain as follows:

$$R_i(\omega)=S_{1i}(\omega)*S_{2i}(\omega)'*F_i(\omega), \quad \text{(Equation 5)}$$

$$R_i(l)=F^{-1}(R_i(\omega)), \quad \text{(Equation 6)}$$

where l is a (time) lag, indicating a time-shift, and $F^{-1}$ denotes an inverse Fourier transform.

In some embodiments, $i^{th}$ cross correlation $r_i(l)$ can be defined in time domain as follows:

$$S_{1i}(t)=S_{1i}(t)**h_i(t), \quad \text{(Equation 7)}$$

$$S_{2i}(t)=S_{2i}(t)**h_i(t), \quad \text{(Equation 8)}$$

$$r_i(l)==\Sigma_{t=-T}^{+T} s_{1i}(t)*s_{2i}(t-l), \quad \text{(Equation 9)}$$

where ** denotes convolution integral, and l is a (time) lag, indicating a time-shift.

In some embodiments, after performing cross correlation on filtered signals, the computing system (e.g., the computing system 120 in FIG. 1) may obtain a set of correlations $R_i$ ($1 \leq i \leq n$, n is an integer $\geq 2$) that define correlations at different frequency ranges. For example, $1^{st}$ correlation $R_i$ defines a correlation at frequency ranges corresponding to $1^{st}$ filter $F_1(\omega)$, and $2^{nd}$ correlation $R_2$ defines a correlation at frequency ranges corresponding to $2^{nd}$ filter $F_2(\omega)$.

In some embodiments, after obtaining a set of correlations $R_i(1 \leq i \leq n)$, the computing system may calculate a signal to noise ratio (SNR) of each correlation $R_i$. In some embodiments, the SNR of a correlation can be defined as one of (1) a maximum value of the correlation, (2) entropy measure of the correlation, or (3) a max contrast of the correlation. Among these, in some embodiments, (3) the max contrast SNi of a correlation $r_i(l)$ may be defined as:

$$SNi=\text{maxValue}(r_i(l))/\text{meanValue}(r_i(l)), \quad \text{(Equation 10)}$$

where maxValue(•) is a maximum operator that calculates a value or amplitude of a peak of correlation $r_i(l)$, and meanValue(•) is average operator that calculates an average value or a mean value of correlation $r_i(l)$.

In some embodiments, (2) entropy measure of the correlation may be defined as:

$$S=-\Sigma P_i \log P_i \quad \text{(Equation 17)}$$

Where S is the entropy, Pi is the probability mass function of a sample i (e.g., a correlation $r_i(l)$). Minimum entropy can be a measure of best Signal to Noise ratio. In some embodiments, Pi is a probability mass function of $i^{th}$ sample correlation $r_i(l)$, and a minimum value of the entropy measure S may be selected as a measure of the SNR.s In some embodiments, after calculating SNi of correlations $r_i(l)$ ($1 \leq i \leq n$), the computing system may choose or select $r_m(l)$ that has a maximal SNi among all i's.

In some embodiments, after selecting a correlation with an optimal or maximal SNR (e.g., $r_m(l)$), the computing system may calculate location and intensity of a leak in a pipe. In some embodiments, a position of a leak relative to the sensors (e.g., the sensors 141, 142 in FIG. 1) can be related to a lag at which a cross correlation has a maximum value (e.g., lag l at which the correlation $r_m(l)$ has a maximum value or a peak).

In some embodiments, a distance Dist from a sensor to a leak may be given as:

$$\text{Dist}=(L+v*dt)/2, \quad \text{(Equation 11)}$$

where L is a pipe length (m), dt=maxIndex($r_m(l)$), dt is time lag of a maximum value of correlation $r_m(l)$, and v is a velocity of sound in the pipe.

In some embodiments, intensity I of correlation $r_m(l)$ as an intensity of a leak may be given as:

$$I=\text{maxValue}(r_m(l)), \quad \text{(Equation 12)}$$

where maxValue(•) is a maximum operator that calculates a value or amplitude of a peak of correlation $r_m(l)$.

Figures 7A, 7B:
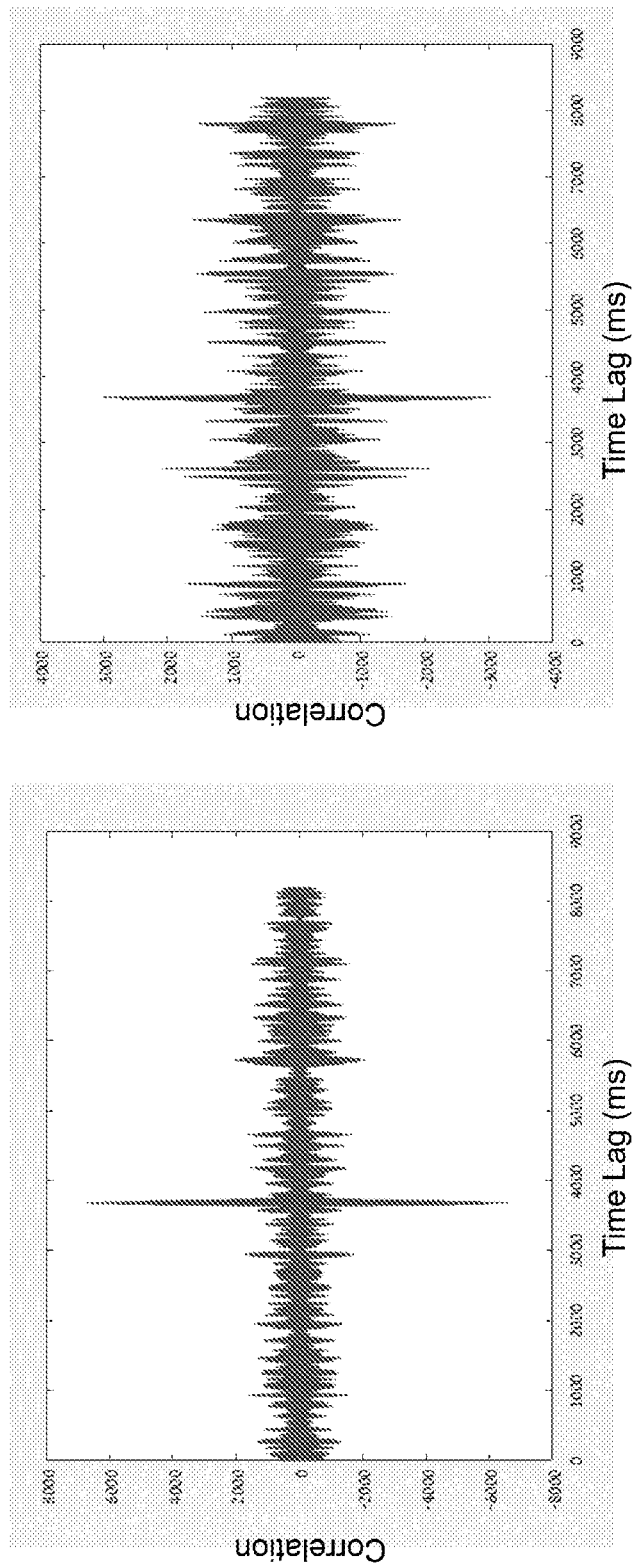
FIG. 7A is a diagram illustrating an example cross correlation with maximal signal to noise ratio (SNR) according to some embodiments.
FIG. 7B is a diagram illustrating an example cross correlation with non-maximal SNR.

FIG. 7A is a diagram illustrating an example cross correlation with maximal signal to noise ratio (SNR) according to some embodiments, and FIG. 7B is a diagram illustrating an example cross correlation with non-maximal SNR.

As shown in FIG. 7A, the computing system can calculate multi-spectral correlations to obtain correlation $r_m(l)$ with optimal or maximal SNR. With correlation with optimal or maximal SNR, the computing system can detect leaks that cannot be detected with cross correlation using non-optimal filtering (see an example of a correlation with non-maximal or non-optimal SNR in FIG. 7B).

Figure 8:
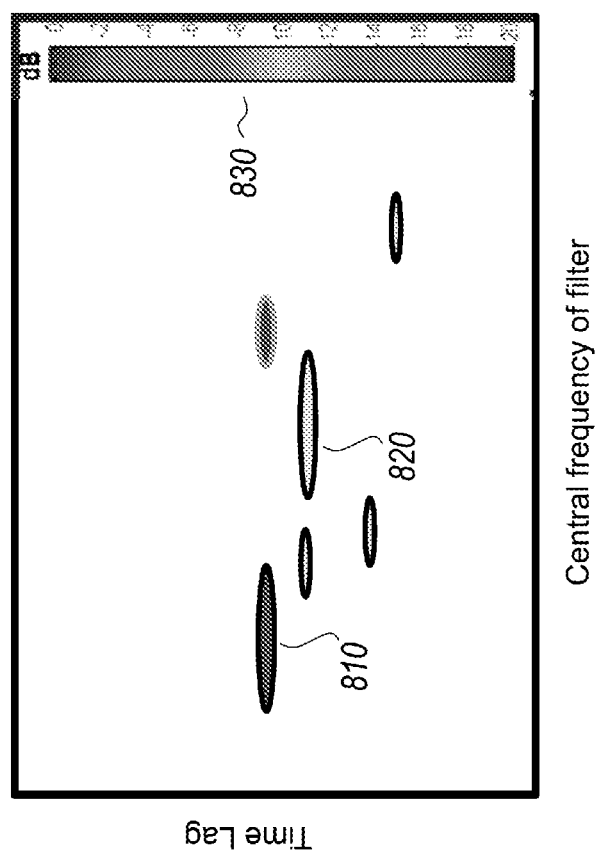
FIG. 8 illustrates a three-dimensional (3D) chart of correlations with different filters according to some embodiments.

FIG. 8 illustrates a three-dimensional (3D) chart of correlations with different filters according to some embodiments.

In some embodiments, the computing system can present or display (e.g., via the display 127 in FIG. 1) correlations at all frequency domains (e.g., correlations calculated based on all filters $F_i(\omega)$). In some embodiments, the computing system can display a three-dimensional (3D) chart that shows intensity of a correlation (e.g., in dB) at a time lag (e.g., a y-axis in FIG. 8) and a central frequency of the filter (e.g., an x-axis in FIG. 8). In some embodiments, the 3D chart may include an axis or other user interface representing different correlation functions. For example, when a user selects a particular time lag from the y-axis and a particular central frequency from the x-axis, via an input device (e.g., the input device 128 in FIG. 1), the computing system may display a corresponding correlation with an optimal or maximal SNR as a graphical object (e.g., ellipses 810 or 820 in FIG. 8). In some embodiments, color of the graphical object (e.g., color filled in the ellipses 810 or 820) may indicate a color-coded intensity or value of the corresponding correlation (in dB, for example). In some embodiments, the 3D chart may include a picture 830 where intensity or value of correlation is translated to a corresponding color code.

Figure 9:
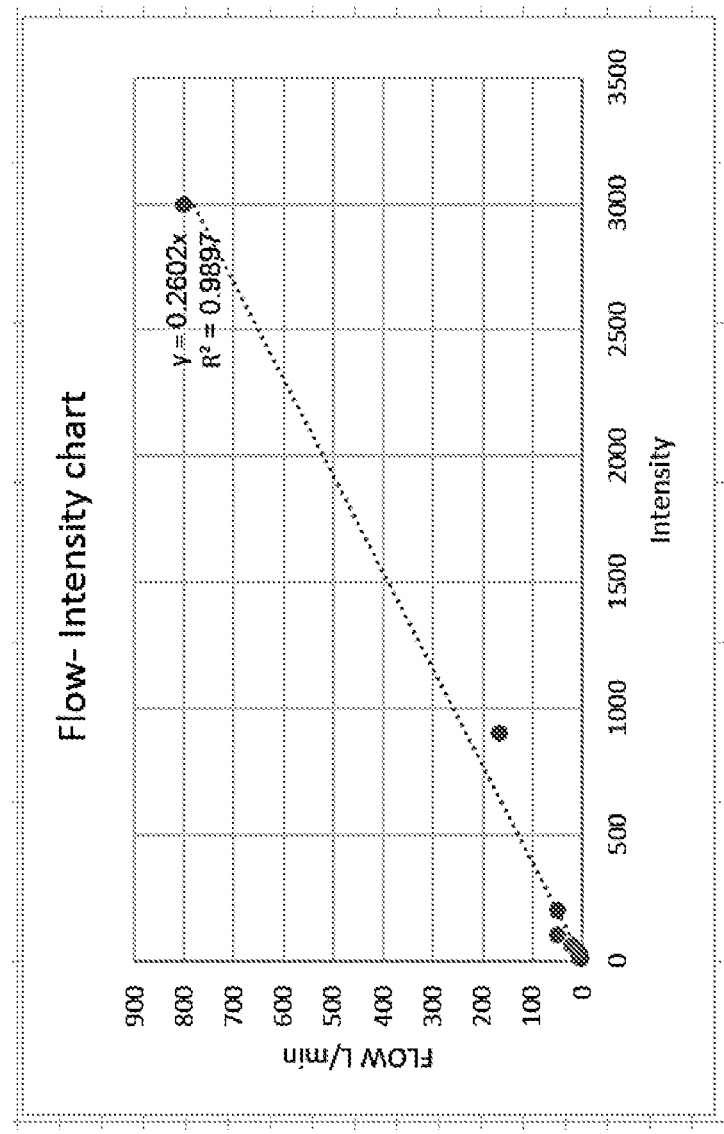
FIG. 9 illustrates a flow-intensity chart according to some embodiments.

FIG. 9 illustrates a flow-intensity chart according to some embodiments.

In some embodiments, a leak is characterized by: (i) its flow; and (ii) its differential pressure. Differential pressure according to some embodiments is the difference between the water pressure in the pipe and the pressure outside it. The power (watts) released by the leak jet of leak may be calculated from the following formula:

$$\text{Jet Power }[N\times m/s]=\text{Flow }[m^3/s]\times\text{Pressure }[N/m^2] \quad \text{(Equation 13)}$$

According to some embodiments, a fraction of the calculated jet power is converted to the acoustic power that travels over the pipes to the sensors. A conversion ratio denoted by K1 may depend on numerous factors (i.e., the shape of the leak, etcetera) that influence the jet velocity.

In some embodiments, the acoustic vibrations from leak propagate to sensors along the pipe and may be represented by a characteristic attenuation coefficient denoted by K2. In order to estimate the acoustic power at the leak, a pipe attenuation model is implemented. The model assumes an attenuation coefficient over the pipe according to the pipe material and/or additional pipe characteristics. The calibrating of the model by measuring attenuation coefficient for the relevant pipes may improve its accuracy and may be applicable/scalable to large installation projects.

In some embodiments, acoustic power may be calculated by a function f, which factors in both the sensors signal correlation intensity and the signal attenuation in the pipes:

$$\text{Acoustic Power},P_a=f(\text{correlation intensity,attenuation}) \quad \text{(Equation 14)}$$

In some embodiments, the calculated acoustic power and pressure may be factored as part of the leak flow calculation:

$$\text{Leak Flow}=\text{Acoustic Power}\div(\text{Conversion Factor}\times\text{Pressure}) \quad \text{(Equation 15)}$$

FIG. 9 shows an empirical relationship between a leak flow and a calculated correlation intensity based on measured leaks and hydrant openings at pressure of ~4 Bars. FIG. 9 shows that there is a good linear relationship between a calculated intensity and a leak flow at a given pressure.

In some embodiments, a system (e.g., the leak detection system 1000) for detecting leaks in a pipe (e.g., the pipes 1200), may include at least one sensor (e.g., the sensors 141, 142 in FIG. 1) installed on the pipe, and a processor (e.g., the processor 121 in FIG. 1). The processor may be configured to generate a plurality of signals (e.g., raw acoustic signals as shown in FIG. 4 or filtered signals as shown in FIG. 5) based on measurements from the at least one sensor. The processor may be configured to calculate a plurality of cross correlations (e.g., correlations $R_i$ or $r_i$ ($1\leq i\leq n$)) from the plurality of signals, each cross correlation corresponding to two of the plurality of signals (e.g., $S_{1i}$ and $S_{2i}$ in Equation 5-9). The processor may be configured to calculate a signal to noise ratio (SNR) of each of the plurality of cross correlations (e.g., max contrast SNi of a correlation $r_i(l)$ in Equation 8). The processor may be configured to select a cross correlation that has a greatest SNR among the plurality of cross correlations (e.g., $r_m(l)$ among $r_i(l)$ ($1\leq i\leq n$)). The processor may be configured to detect a leak in the pipe based on the selected cross correlation (e.g., using Equation 11).

In some embodiments, the at least one sensor may include at least one of acoustic sensor or water meter. The plurality of signals are acoustic signals (e.g., raw acoustic signals as shown in FIG. 4 or filtered signals as shown in FIG. 5).

In some embodiments, in performing the plurality of cross correlations, the processor may be configured to perform a frequency filtering on the plurality of signals using a filter (e.g., filter 400 in FIG. 5; $F_i(\omega)$ or $h_i(t)$) that is defined over a frequency range of a sensor response (see FIG. 5). The processor may be configured to calculate the plurality of cross correlations from a plurality of filtered signals (e.g., $S_{1i}$ and $S_{2i}$ in Equation 5-9) as a result of the frequency filtering (e.g., Equation 5 and Equations 7-8).

In some embodiments, the frequency range of the sensor response may include at least one of (1) frequency ranges equally spaced in frequency (see FIG. 5, for example) or (2) a frequency range divided using a fractal division.

In some embodiments, the system may further include a display (e.g., the display 127 of the system 1000 in FIG. 1). The processor may be further configured to cause the display to display a three-dimensional (3D) chart (e.g., the 3D chart in FIG. 8) indicating a value of a cross correlation over (1)

different frequency ranges defined based on corresponding frequency filters (e.g., central frequency of filters in x-axis in FIG. 8) and (2) different time lags of the cross correlation (e.g., time lag in y-axis in FIG. 8).

In some embodiments, in calculating the SNR of each of the plurality of cross correlations, the processor may be configured to calculate the SNR of each cross correlation using one selected from a max value of a cross correlation, entropy measured on a cross correlation, or a max contrast value of a cross correlation (e.g., max contrast SNi of a correlation $r_i(l)$ in Equation 8).

In some embodiments, in detecting the leak in the pipe, the processor may be configured to calculate a leak location based on a time lag of the selected cross correlation (e.g., time lag dt of a maximum value of correlation $r_m(l)$ in Equation 11). The processor may be configured to calculate a leak intensity based on a max value of the selected cross correlation (e.g., Equation 12).

Figure 10:
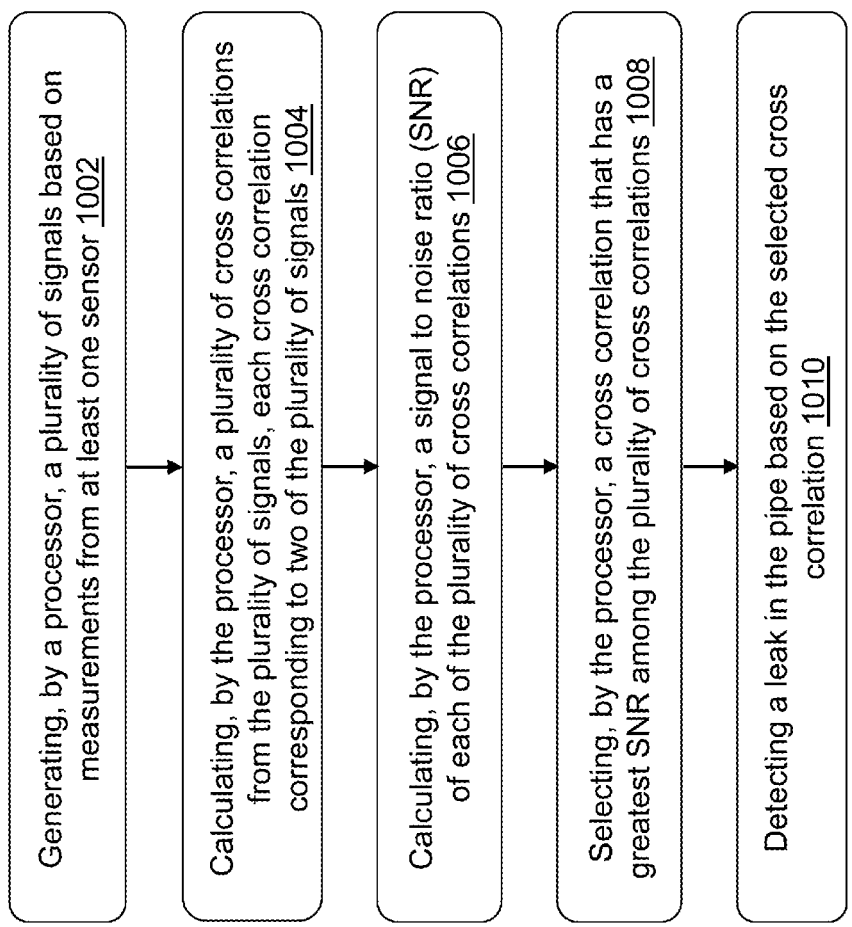
FIG. 10 is a flowchart illustrating an example methodology for detecting leaks in a pipe.

FIG. 10 is a flowchart illustrating an example methodology for detecting leaks in a pipe. In some embodiments, a system (e.g., the leak detection system 1000) may include a processor (e.g., the processor 121 in FIG. 1) and at least one sensor (e.g., the sensors 141, 142 in FIG. 1) installed on a pipe (e.g., the pipes 1200). In some embodiments, the at least one sensor may include at least one of acoustic sensor or water meter.

In this example, the process begins in step S1002 by generating, by the processor, a plurality of signals (e.g., raw acoustic signals as shown in FIG. 4 or filtered signals as shown in FIG. 5) based on measurements from the at least one sensor. The plurality of signals may be acoustic signals (e.g., raw acoustic signals as shown in FIG. 4).

In step S1004, in some embodiments, a plurality of cross correlations (e.g., correlations $R_i$ or $r_i$ ($1 \le i \le n$)) may be calculated by the processor from the plurality of signals. Each cross correlation may correspond to two of the plurality of signals (e.g., $S_{1i}$ and $S_{2i}$ in Equation 5-9).

In some embodiments, in calculating the plurality of cross correlations, a frequency filtering may be performed on the plurality of signals using a filter (e.g., filter 400 in FIG. 5; $F_i(\omega)$ or $h_i(t)$) that is defined over a frequency range of a sensor response (see FIG. 5). The plurality of cross correlations may be calculated from a plurality of filtered signals (e.g., $S_{1i}$ and $S_{2i}$ in Equation 5-9) as a result of the frequency filtering e.g., Equation 5 and Equations 7-8). In some embodiments, the frequency range of the sensor response may include at least one of (1) frequency ranges equally spaced in frequency (see FIG. 5, for example) or (2) a frequency range divided using a fractal division.

In step S1006, in some embodiments, a signal to noise ratio (SNR) of each of the plurality of cross correlations (e.g., max contrast SNi of a correlation $r_i(l)$ in Equation 8) may be calculated by the processor, In some embodiments, in calculating the SNR of each of the plurality of cross correlations, the SNR of each cross correlation may be calculated using one selected from a max value of a cross correlation, entropy measured on a cross correlation, or a max contrast value of a cross correlation (e.g., max contrast SNi of a correlation $r_i(l)$ in Equation 8).

In step S1008, in some embodiments, a cross correlation that has a greatest SNR among the plurality of cross correlations (e.g., $r_m(l)$ among $r_i(l)$ ($1 \le i \le n$)) may be selected by the processor.

In step S1010, in some embodiments, a leak in the pipe may be detected based on the selected cross correlation (e.g., using Equation 11). In some embodiments, in detecting the leak in the pipe, a leak location may be calculated based on a time lag of the selected cross correlation (e.g., time lag dt of a maximum value of correlation $r_m(l)$ in Equation 11), and a leak intensity may be calculated based on a max value of the selected cross correlation (e.g., Equation 12).

In some embodiments, the method may further include a three-dimensional (3D) chart (e.g., the 3D chart in FIG. 8) indicating a value of a cross correlation over (1) different frequency ranges defined based on corresponding frequency filters (e.g., central frequency of filters in x-axis in FIG. 8) and (2) different time lags of the cross correlation (e.g., time lag in y-axis in FIG. 8) may be displayed by a display of the system (e.g., the display 127 of the system 1000 in FIG. 1).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order.

Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for detecting leaks in a pipe in a system comprising a processor and at least one sensor installed on the pipe, said method comprising:

generating, by the processor, a plurality of signals based on measurements from the at least one sensor, calculating, by the processor, at least two cross correlations from the plurality of signals, each cross correlation corresponding to two of the plurality of signals;

calculating, by the processor, a signal to noise ratio (SNR) of each of the at least two cross correlations;

selecting, by the processor, a cross correlation that has a greatest SNR among the at least two cross correlations; and detecting a leak in the pipe based on the selected cross correlation; wherein the at least one sensor comprises at least one of an acoustic sensor and a water meter, and the plurality of signals are acoustic signals, wherein performing the at least two cross correlations comprises:

performing a frequency filtering on the plurality of signals using a filter that is defined over a frequency range of a sensor response; and calculating the at least two cross correlations from a plurality of filtered signals as a result of the frequency filtering, and wherein performing a frequency filtering on the plurality of signals includes applying a mathematical transformation to the plurality of signals.

2. The method according to claim 1, wherein the frequency range of the sensor response includes at least one of (1) frequency ranges equally spaced in frequency or (2) a frequency range divided using a fractal division.

3. The method according to claim 1, further comprising:

displaying, by a display of the system, a three-dimensional (3D) chart indicating a value of a cross correlation over (1) different frequency ranges defined based on corresponding frequency filters and (2) different time lags of the cross correlation.

4. The method according to claim 1, wherein calculating said at least two cross correlations from the plurality of signals comprises:

calculating $i^{th}$ cross correlation $R_i(\omega)$ and $R_i(l)$ of filtered signals $S_{1i}$ and $S_{2i}$ in frequency domain using the following formulas:

$$R_i(\omega) = S_{1i}(\omega) * S_{2i}(\omega)' * F_i(\omega),$$

$$R_i(l) = F^{-1}(R_i(\omega)),$$

where l is a (time) lag, indicating a time-shift, $F_i$ is a filter, and $F^{-1}$ denotes an inverse Fourier transform.

5. The method according to claim 1, wherein calculating the at least two cross correlations from the plurality of signals comprises:

calculating i$^{th}$ cross correlation r$_i$(l) of filtered signals S$_{1i}$ and S$_{2i}$ in time domain as follows:

$$S_{1i}(t)=S_{1i}(t)**h_i(t),$$

$$S_{2i}(t)=S_{2i}(t)**h_i(t),$$

$$r_i(l)=\Sigma_{t=-T}^{+T}s_{1i}(t)*s_{2i}(t-1)$$

where ** denotes convolution integral, and/is a (time) lag, indicating a time-shift, a h$_i$(t) is a filter.

6. The method according to claim 1, wherein
the filter includes a central frequency and a width Fw,
the frequency range of the sensor response includes a first frequency range F1 and a second frequency range F2, and
the method further includes adjusting the filter in terms of the width Fw and the ranges F1 and F2 to improve a result of calculating the at least two cross correlations.

7. The method according to claim 1, wherein the filter is defined using a continuous wavelet transform of a function f(t), as follows:

$$C(a, b; f(t), \Psi(t)) = \int_{-\infty}^{\infty} f(t)\frac{1}{\sqrt{a}}\Psi^*\left(\frac{t-b}{a}\right)dt$$

where $\Psi$ is a wavelet, and a is a scaling parameter, and
the method further includes finding a wavelet $\Psi$ and a scaling parameter a that optimize a result of calculating the at least two cross correlations.

8. The method according to claim 1, wherein calculating the SNR of each of the at least two cross correlations comprises:
calculating the SNR of each cross correlation using one selected from a max value of a cross correlation, entropy measured on a cross correlation, or a max contrast value of a cross correlation.

9. The method according to claim 8, wherein the max contrast value SNi of a correlation n(l) is calculated from the following formula:

$$SNi=\text{maxValue}(r_1(l))/\text{mean Value}(r_1(l)),$$

where maxValue (•) is a maximum operator that calculates a value or amplitude of a peak of correlation r$_1$(l), and meanValue(−) is average operator that calculates an average value or a mean value of correlation r$_1$(l).

10. The method according to claim 8, wherein the entropy measure S of a correlation n(l) is calculated from the following formula:

$$S=-\Sigma P_i \log P_i$$

where Pi is a probability mass function of lh sample correlation n(l), and
the method further comprises selecting a minimum value of the entropy measure S as a measure of the SNR.

11. The method according to claim 1, wherein detecting the leak in the pipe comprises: calculating a leak location based on a time lag of the selected cross correlation; and calculating a leak intensity based on a max value of the selected cross correlation.

12. The method according to claim 11, wherein calculating the leak location comprises at least one step selected from a group consisting of: (a) calculating a distance Dist from a sensor to a leak from the following formula:

$$\text{Dist}=(L+v*dt)/2,$$

where L is a pipe length (m), dt=maxIndex(rm(l)), dt is time lag of a maximum value of correlation rm(l), and v is a velocity of sound in the pipe; (b) calculating an intensity I of correlation rm(l) as an intensity of a leak from the following formula:

$$I=\text{maxValue}(r_m(l)),$$

where maxValue(•) is a maximum operator that calculates a value or amplitude of a peak of correlation rm(l).

13. The method according to claim 1, further comprising:
detecting the leak by calculating a jet power released by a leak jet of the leak from the following formula:

$$\text{Jet Power }[N\times m/s]=\text{Flow }[m^3/s]\times\text{Pressure }[N/m^2]$$

where Flow is a leak flow, and Pressure is a difference between a water pressure in the pipe and a pressure outside the pipe.

14. The method according to claim 13, further comprising:
calculating the leak flow from the following formulas:

$$\text{Acoustic Power},P_a=f(\text{correlation intensity,attenuation})$$

$$\text{Leak Flow}=\text{Acoustic Power}\div(\text{Conversion Factor}\times\text{Pressure})$$

wherein the acoustic power is calculated by a function f, which factors in both a sensor signal correlation intensity and a signal attenuation in the pipe.

15. A system for detecting leaks in a pipe, comprising:
at least one sensor installed on the pipe;
a processor configured to generate a plurality of signals based on measurements from the at least one sensor,
calculate at least two cross correlations from the plurality of signals, each cross correlation corresponding to two of the plurality of signals,
calculate a signal to noise ratio (SNR) of each of the at least two cross correlations,
select a cross correlation that has a greatest SNR among the at least two cross correlations, and
detect a leak in the pipe based on the selected cross correlation; wherein the at least one sensor comprises at least one of acoustic sensor or water meter, and the plurality of signals are acoustic signals,
wherein in performing the at least two cross correlations, the processor is configured to:
perform a frequency filtering on the plurality of signals using a filter that is defined over a frequency range of a sensor response; and
calculate the at least two cross correlations from a plurality of filtered signals as a result of the frequency filtering, and
wherein at least one of the following is being held true (a) the frequency range of the sensor response includes at least one of (1) frequency ranges equally spaced in frequency or (2) a frequency range divided using a fractal division; (b) wherein said system further comprising a display, wherein the processor is further configured to: cause the display to display a three-dimensional (3D) chart indicating a value of a cross correlation over (1) different frequency ranges defined based on corresponding frequency filters and (2) different time lags of the cross correlation, (c) wherein in performing a frequency filtering on the plurality of signals, the processor is configured to apply a mathematical transformation to the plurality of signals; (d) the filter includes a central frequency and a width Fw, the frequency range of the sensor response includes a first frequency range F1 and a second frequency range F2, and the processor is further configured to adjust the filter in terms of the width Fw and the ranges F1 and F2 to improve a result of calculating the at least two cross correlations; wherein the filter is defined using a continuous wavelet transform of a function f(t), as follows:

$$C(a, b; f(t), \Psi(t)) = \int_{-\infty}^{\infty} f(t) \frac{1}{\sqrt{a}} \Psi^*\left(\frac{t-b}{a}\right) dt$$

where $\Psi$ is a wavelet, and a is a scaling parameter, and the processor is further configured to find the wavelet $\Psi$ and scaling parameter a that optimize a result of calculating the at least two cross correlations; (f) and any combination thereof.

16. The system according to claim 15, wherein in calculating the at least two cross correlations from the plurality of signals, the processor is configured to:
calculate $i^{th}$ cross correlation $R_i(\omega)$ and $R_i(l)$ of filtered signals $S_{1i}$ and $S_{2i}$ in frequency domain using the following formulas:

$$R_i(\omega) = S_{1i}(\omega) * S_{2i}(\omega)' * F_i(\omega),$$

$$R_i(l) = F^{-1}(R_i(\omega)),$$

where l is a (time) lag, indicating a time-shift, $F_i$ is a filter, and $F^{-1}$ denotes an inverse Fourier transform.

17. The system according to claim 15, wherein in calculating the at least two cross correlations from the plurality of signals, the processor is configured to:
calculate $i^{th}$ cross correlation n(l) of filtered signals $S_{1i}$ and $S_{2i}$ in time domain as follows:

$$s_{1i}(t) = S_{1i}(t) ** h_i(t),$$

$$s_{2i}(t) = S_{2i}(t) ** h_i(t),$$

$$r_i(l) = \sum_{t=-T}^{+T} s_{1i}(t) * s_{2i}(t-1),$$

where ** denotes convolution integral, and l is a (time) lag, indicating a time-shift, and $h_i(t)$ is a filter.

18. The system according to claim 15, wherein in calculating the SNR of each of the at least two cross correlations, the processor is configured to:
calculate the SNR of each cross correlation using one selected from a max value of a cross correlation, entropy measured on a cross correlation, or a max contrast value of a cross correlation.

19. The system according to claim 18, wherein at least one of the following is held true (a) the max contrast value SNi of a correlation $r_1(l)$ is calculated from the following formula:

$$SNi = \text{maxValue}(r_1(l))/\text{mean Value } r_1(l),$$

where maxValue(•) is a maximum operator that calculates a value or amplitude of a peak of correlation $r_1(l)$, and mean Value(−) is average operator that calculates an average value or a mean value of correlation $r_1(l)$; (b) wherein the entropy measure S of a correlation $r_1(l)$ is calculated from the following formula:

$$S = -\Sigma P_i \log P_i$$

where Pi is a probability mass function of lh sample correlation n(l), and the processor is further configured to select a minimum value of the entropy measure S as a measure of the SNR; (c) and any combination thereof.

20. The system according to claim 15, wherein in detecting the leak in the pipe, the processor is configured to:
calculate a leak location based on a time lag of the selected cross correlation; and
calculate a leak intensity based on a max value of the selected cross correlation.

21. The system according to claim 20, wherein in calculating the leak location, the processor is configured to at least one selected from a group consisting of:
(a) calculate a distance Dist from a sensor to a leak from the following formula:

$$\text{Dist} = (L + v * dt)/2,$$

where L is a pipe length (m), dt=maxIndex($r_m(l)$), dt is time lag of a maximum value of correlation rm(l), and v is a velocity of sound in the pipe;
(b) calculate an intensity I of correlation $r_m(l)$ as an intensity of a leak from the following formula:

$$I = \text{maxValue}(r_m(l)),$$

where maxValue(•) is a maximum operator that calculates a value or amplitude of a peak of correlation $r_m(l)$;
(c) any combination thereof.

22. The system according to claim 15, wherein the processor is configured to: detect the leak by calculating a jet power released by a leak jet of the leak from the following formula:

Jet Power [N×m/s]=Flow [$m^3$/s]×Pressure [$N/m^2$], where Flow is a leak flow, and Pressure is a difference between a water pressure in the pipe and a pressure outside the pipe.

23. The system according to claim 22, the processor is further configured to; calculate the leak flow from the following formulas:

Acoustic Power,$P_i$=f(correlation intensity,attenuation)

Leak Flow=Acoustic Power÷(Conversion Factor× Pressure)

wherein the acoustic power is calculated by a function f, which factors in both a sensors signal correlation intensity and a signal attenuation in the pipe.

* * * * *